(12) United States Patent
Kallabis

(10) Patent No.: US 8,360,240 B2
(45) Date of Patent: Jan. 29, 2013

(54) PROTECTIVE DEVICE

(75) Inventor: Gabriel Kallabis, Spirkelbach (DE)

(73) Assignee: STABILA Messgerate Gustav Ullrich GmbH, Annweiler (DE)

( * ) Notice: Subject to any disclaimer, the term of this patent is extended or adjusted under 35 U.S.C. 154(b) by 228 days.

(21) Appl. No.: 11/778,768

(22) Filed: Jul. 17, 2007

(65) Prior Publication Data

US 2008/0043409 A1 Feb. 21, 2008

(30) Foreign Application Priority Data

Aug. 21, 2006 (DE) .................. 20 2006 012 791 U
Sep. 20, 2006 (DE) .................. 20 2006 014 576 U

(51) Int. Cl.
*B65D 85/00* (2006.01)
*B65D 85/38* (2006.01)
*B65D 81/02* (2006.01)

(52) U.S. Cl. ........ 206/701; 206/722; 206/471; 206/586; 206/305; 206/523

(58) Field of Classification Search .................. 206/701, 206/722, 724, 471, 586, 587, 305, 523
See application file for complete search history.

(56) References Cited

U.S. PATENT DOCUMENTS

| | | | | |
|---|---|---|---|---|
| 3,971,035 A | * | 7/1976 | Maxwell | 346/33 TP |
| 4,662,707 A | | 5/1987 | Teach et al. | |
| 4,911,962 A | * | 3/1990 | Baumann et al. | 428/36.5 |
| 4,933,231 A | * | 6/1990 | Seber | 442/148 |
| 5,199,609 A | * | 4/1993 | Ash, Jr. | 222/94 |
| 5,465,838 A | * | 11/1995 | Hollander et al. | 206/305 |
| 5,539,990 A | * | 7/1996 | Le | 33/283 |
| 5,666,736 A | * | 9/1997 | Wen | 33/291 |
| 5,875,821 A | * | 3/1999 | Dumser et al. | 138/162 |
| 5,907,907 A | * | 6/1999 | Ohtomo et al. | 33/291 |
| 5,946,087 A | * | 8/1999 | Kasori et al. | 356/249 |
| 6,068,821 A | | 5/2000 | VanDeGraaf | |
| 6,092,651 A | * | 7/2000 | Miller | 206/305 |
| 6,128,326 A | | 10/2000 | Kousek et al. | |
| 6,179,122 B1 | * | 1/2001 | Moncrief et al. | 206/320 |
| 6,313,184 B1 | * | 11/2001 | Sasaki et al. | 521/56 |
| 6,354,010 B1 | * | 3/2002 | Shirai | 33/292 |
| 6,626,362 B1 | * | 9/2003 | Steiner et al. | 235/462.45 |
| 6,688,011 B2 | * | 2/2004 | Gamal et al. | 33/290 |
| 6,871,408 B2 | * | 3/2005 | Malard et al. | 33/286 |
| 6,938,350 B1 | | 9/2005 | Hershey | |
| 6,996,910 B2 | * | 2/2006 | Liao | 33/285 |
| 2006/0013278 A1 | | 1/2006 | Raskin et al. | |

FOREIGN PATENT DOCUMENTS

| | | |
|---|---|---|
| DE | 2029968 | 12/1971 |
| DE | 8812269 | 11/1988 |
| DE | 20021784 | 4/2001 |
| EP | 1376055 | 1/2004 |
| JP | 2002071350 | 3/2002 |
| WO | WO 01/22430 | 3/2001 |

* cited by examiner

*Primary Examiner* — J. Gregory Pickett
*Assistant Examiner* — Ernesto Grano
(74) *Attorney, Agent, or Firm* — Dennison, Schultz & MacDonald

(57) ABSTRACT

A protective device made of plastic, which is intended as an instrument housing for a measuring instrument. In order to ensure sufficient shock protection, which assures that the protective device is not damaged by hard shocks, the protective device is assembled from a core which is made of thermoplastic material and at least in sections encloses the housing, and a sheathing, which is made particularly of rubber elastic material.

29 Claims, 10 Drawing Sheets

PROTECTIVE DEVICE

BACKGROUND OF THE INVENTION

The invention pertains to a protective device made of plastic, which is intended as a housing, such as an instrument housing. The invention especially pertains to a protective housing, which, at least in part, encloses an instrument housing, preferably a measuring device, such as laser equipment, and at least in sections consists of plastic.

A protective housing for a laser level is known from DE-U-200 21 781. The laser instrument is completely enclosed by the protective housing and consists of plastic material. In order to use the laser instrument, the protective housing must be opened and the laser instrument be placed on an outer surface of the protective housing.

In order to protect the laser instrument, its instrument housing is enclosed by a protective housing, which is designated as a receptacle according to EP-B-1 376 055. The protective housing has U-shaped metal brackets, which can be covered in sections with shock absorbing plastic.

U.S Pat. No. 6,128,326 reveals a construction laser with housing, which has handles that consist of a solid core of hard plastic and a sheathing of foamed-up plastic.

A hazard light in accordance with DE-A-20 29 968 is enclosed by two interlocking spherical shells that serve as protection. The plastic spherical shells can have elastic buffers made from rubber or soft plastic to prevent sliding.

In order to protect a laser instrument, the JP-A-2002 071 350 provides that the housing is enclosed by a rubber shell.

SUMMARY OF THE INVENTION

The objective of the present invention is to further develop a protective device of the initially described type, which offers a sufficient shock protection, whereas it is also assured that the protective device itself is protected from damage in case of hard shocks. The construction of the protective device shall also be simple as well as cost effective.

In order to meet this objective, the invention primarily provides that the protective device consists of a core, which at least partially encloses the housing, which is made of a thermo-plastic material, and a sheathing. Particularly at the corners and/or edges of the housing, the protective device incorporates elements, which are supported and spaced in relation to each other, which are joined and in sections encased by the sheathing. The sheathing may attach the protective device to the housing.

The invention is in particular so characterized by a protective device in the form of a protective housing, that the protective housing consists of a core, which is made of a thermo-plastic material, and a sheathing. This can be made by heat-treating the core but preferably consists of a rubber elastic material. This may be, or contain, natural rubber. It is in particular intended, however, that the sheathing consists of EPDM (Ethylene Propylene Diene Monomer). The core itself should consist of expandable Polypropylene (EPP).

It is, however, also possible to produce the sheathing by laminating foils or fabrics. These designs can only then be applied in principle, however, when the core has a simple structure.

Based on the invention principle there results the benefit that a protective device is made available, which allows a great degree of flexibility without sustaining any lasting damage. Thus the excellent shock-absorbing characteristics together with the excellent recovery characteristics of EPP are utilized for the core, which can also be produced in a cost-efficient and simple manner. Without protection, the thermoplastic material offers, however, a low abrasion resistance and only little protection against penetration of sharp objects, such as stones. Applying sheathing to the core helps to eliminate these disadvantages since the sheathing follows the flexing of the core even under extreme outside influences.

Although the application of expanded Polypropylene for shock-protection and insulation, e.g. for transport boxes or as packaging is commonly known, the boxes and/or packaging do not have any sheathing. Damages to the outer surface are more or less accepted. It is also a known practice to install printed circuit boards in PC's in receptacles made from EPP. These are then enclosed by a metal housing. Shock absorption systems used in the vehicle industry consist of a core made from EPP, which is enclosed by a more solid plastic material. The possibility of rips is thus accepted in case the material is exposed to stress.

The core of the protective device, such as the protective housing, should consist of sections that can be assembled. The core is thus form-fitted and partially encloses the instrument housing and/or is attached to it. For this, the core may have arms with cylindrical sections, which originate from a frame, whereas the cylindrical sections of the arms are form-fitted and received in sections by cylindrically hollow arms of the instrument housing, which have longitudinal slots. The periphery of the arms then act upon the longitudinal slots.

In the preferred version, the frame has a square geometry, whereas one arm should always be shaped as a plate. Between the plate-like arms, an element which is shaped to be used as a handle, such as a tube or pipe element, serves as additional protection for the instrument housing.

The protective housing preferably manifests a cuboid-shaped framework as the core with longitudinal and cross-arms, whereas the cross-arms form the particular frame.

In the preferred version, the core and the sheathing are separately produced components, whereas the strength of the sheathing material should be between 0.5 mm and 5 mm. The strength of the sheathing material used for protective housings that will hold laser equipment should be between 2 mm and 3 mm and be EPDM material. The sheathing enclosing the core should be mostly form-fitting. The sheathing shall be held in position by partially attaching or clamping it between the core and sections of the equipment housing.

In addition, an improvement of the invention for laser use provides an attachment which encloses the laser beam optic of the laser instrument that is arranged in an offset and originates from the top of the frame of the protective housing. The attachment should thus consist of a first ring element, which is connected to the top frame by snap-on or plug-in connection, and a second ring element, which is connected to the first ring element by flat bars, and which consists of a core that consists of a thermo-plastic material, such as EEP, and a sheathing enclosing the core, which consists of natural rubber as well as EPDM.

It is also possible that the second ring element may consist of metal or plastic, such as fiber-reinforced plastic, which is, according to the invention, at least in part, encased by a particular protective device, thus by a core that is enclosed by thermo-plastic material, which again is encased by a sheathing and a casing. Independent thereof, the first ring element and/or the flat bars shall consist of plastic material, such as fiber-reinforced plastic or fiberglass-reinforced Polyamide. The flat bars and the first ring element are separate elements, whereby the flat bars can be connected with the second ring element. This can be done with a snap-on connection. It is also possible to form the second ring element and the bars in an integrated form.

The first ring element is also thereby characterized by it being the receptacle for the laser and/or the laser optic and also being able to manifest a control panel.

In order to hold the ring element in position, the flat bars are partially resting on the first ring element, which in turn rests on the instrument housing. Extensions of the bars are shaped like sleeves and have an internal thread, into which stud bolts can be inserted, which originate from the housing's bottom plate. The stud bolts also penetrate bored holes of the protective device and/or the protective housing, particularly its arms, whereas the protective housing itself is simply held in position.

BRIEF DESCRIPTION OF THE DRAWINGS

Additional details, advantages and characteristics of the invention are not only found in the claims, the characteristics found therein—individually or in combination—but also within the following explanation of one of the preferred embodiments in relation to the drawings, which show:

DESCRIPTION OF THE PREFERRED EMBODIMENTS

Figure 1:
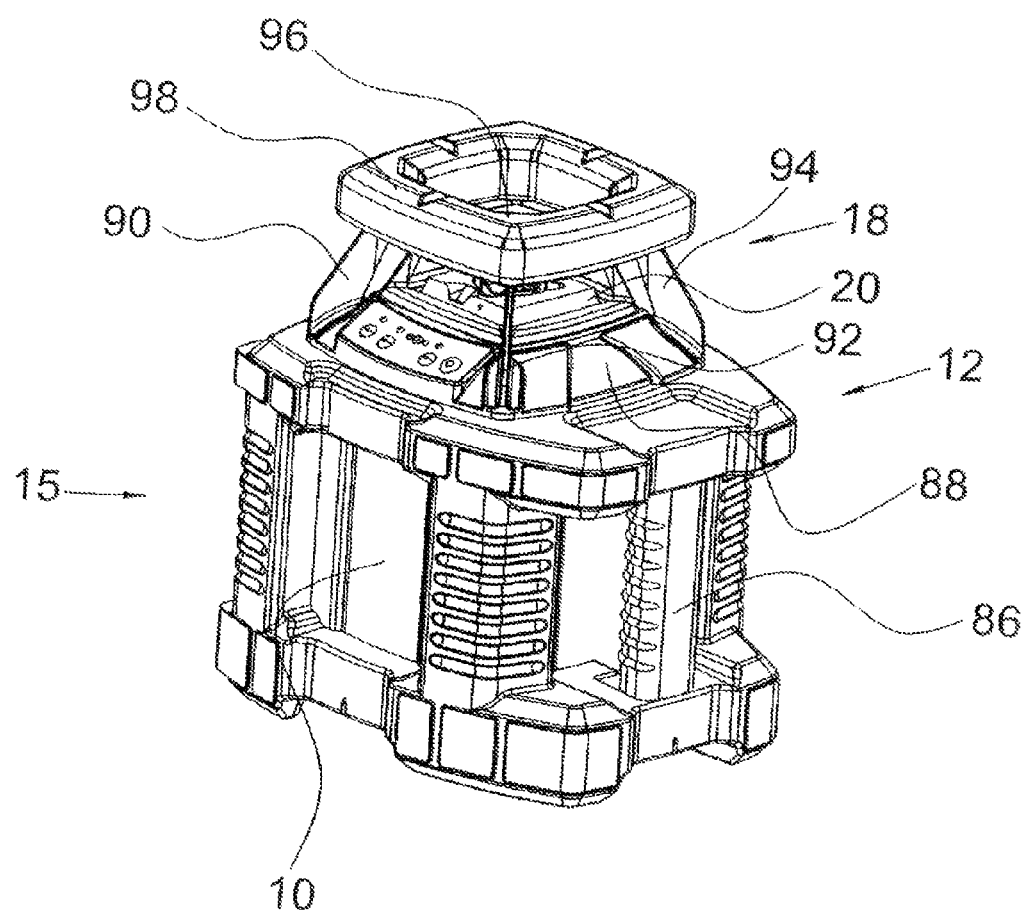
FIG. 1: A laser instrument that is enclosed by a protective housing.

The premise on which the invention is based is explained in FIGS. 1 through 7 by means of a protective housing 12, which encloses a laser instrument 10, without being limited therein. Rather, the premise based on the invention applies to any protective housings, which should preferably enclose those instruments that are susceptible to shock. This particularly includes measuring devices.

The invention pertains in general to a protective device for a housing, whereby the protective device must only enclose the housing partially. Thus it is possible, that the protective device may consist of corner elements, which are supported by the corners of the housing and are connected with each other in a manner that is described in the following.

In the variant of FIGS. 1 through 7, the protective housing 12 consists of a two-part base part 15 as well as an attachment 18, which encloses the laser emission optic 20. The attachment 18 is, however, not a required characteristic. It is furthermore not required that the protective housing 12 consists of more than two or three parts. Rather, the protective housing 12 can be made as a single component.

Figure 6:
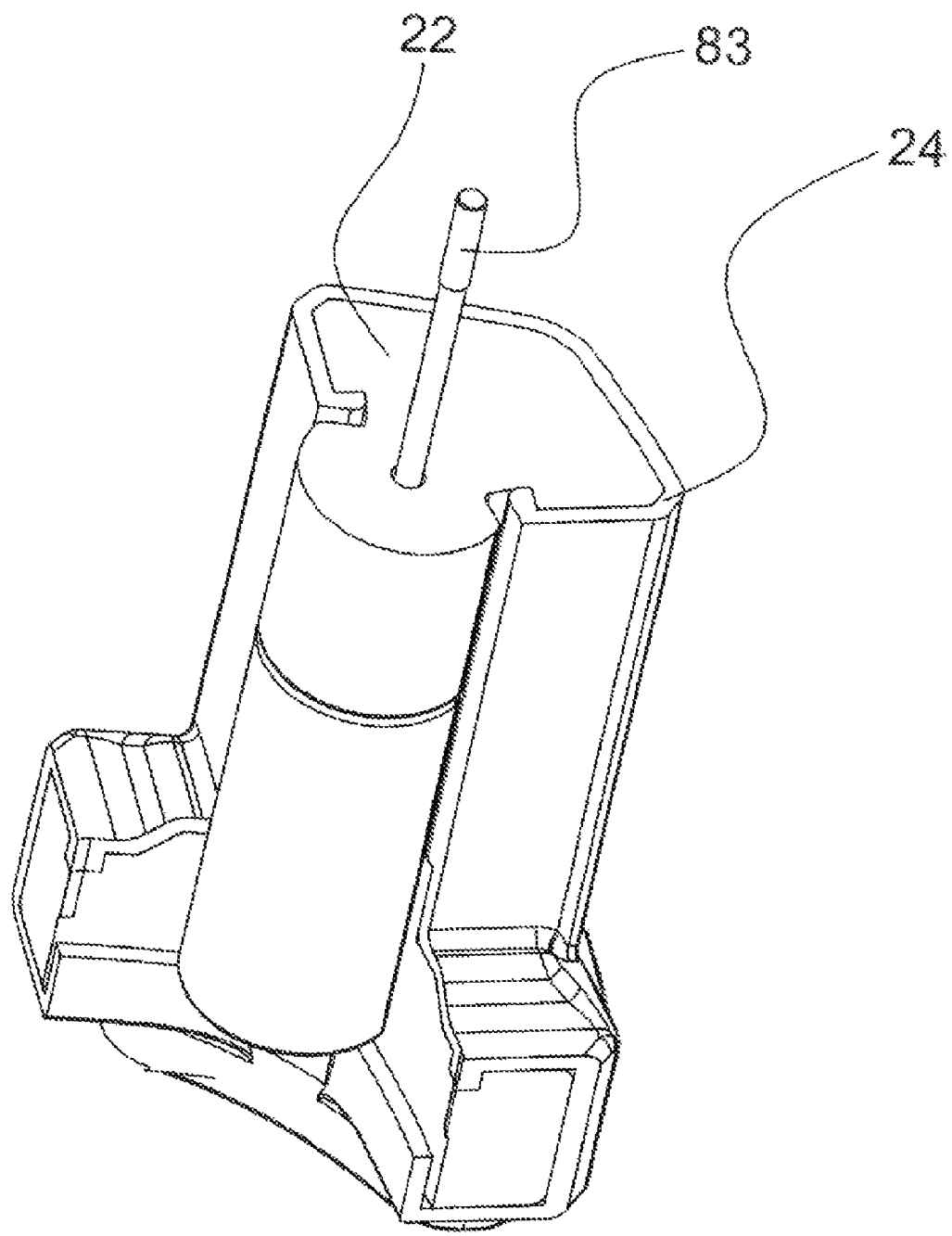
FIG. 6: A section of the protective housing according to FIG. 1.

The protective housing 12 is independently characterized in that it consists of a core 22 and a sheathing 24, as illustrated in principle in the section of FIG. 6. The section also illustrates a part of the arm of protective housing 12. The sheathing 24 can be formed as a quasi support that encloses the core 22.

According to the invention, the core 22 consists of a material, which is based on thermo-plastics, with excellent shock-absorbing characteristics as well as recovery characteristics. The preferred material is thereby expanded Polypropylene (EPP).

The sheathing 24 can be a laminated foil or a laminated fabric. It is also possible to form the sheathing 24 by heating the core 22, whereby a skin will form to become the sheathing.

In the preferred version, the sheathing 24 consists of a rubber elastic material, such as natural rubber, whereby the application of EPDM (Ethylene Propylene Diene Monomer) is preferred. The sheathing 24 is thereby produced separate from the core 22. In so far as the sheathing 24 and/or the casing manifests a sufficient strength, then it possesses a sufficient self-rigidity. The sheathing 24 encloses the core 22 for the most part form-fitting independently thereof, in particular peripherally. The sheathing and thus the casing of the core 22 are held in place by means of attaching and/or affixing the protective housing to an instrument housing as demonstrated below.

Manufacturing the sheathing 24 from EPDM has the advantage that the sheathing 24 follows the deformation of the core 22, whereby it is also assured that the core 22 is protected against abrasion or damage due to sharp objects.

Figure 2:
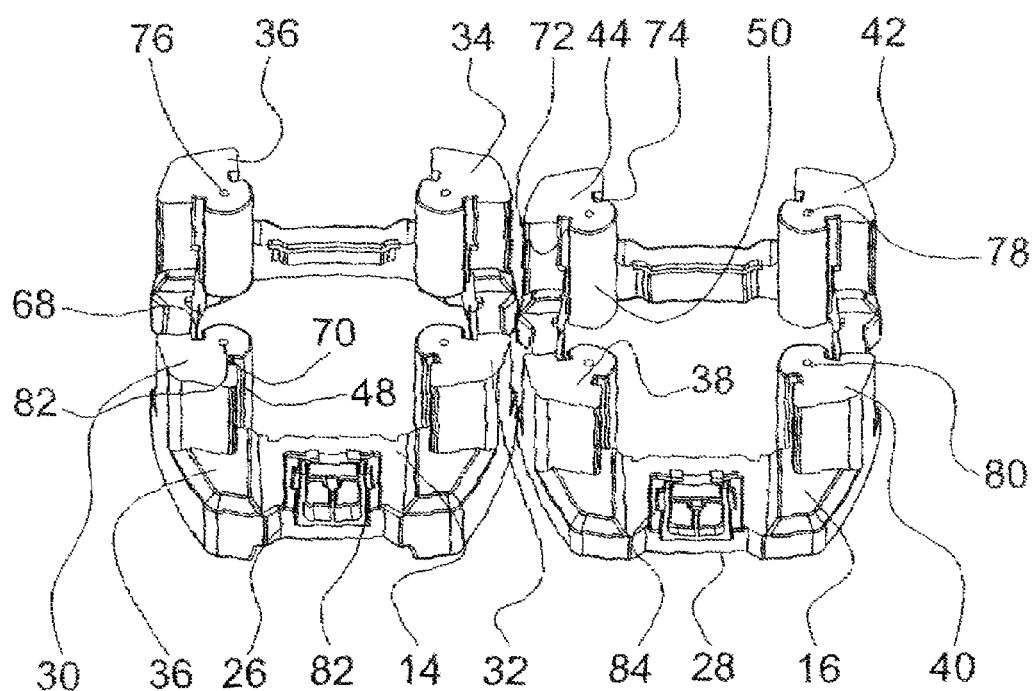
FIG. 2: Sections of a core of the protective housing according to FIG. 1.
Figure 3:
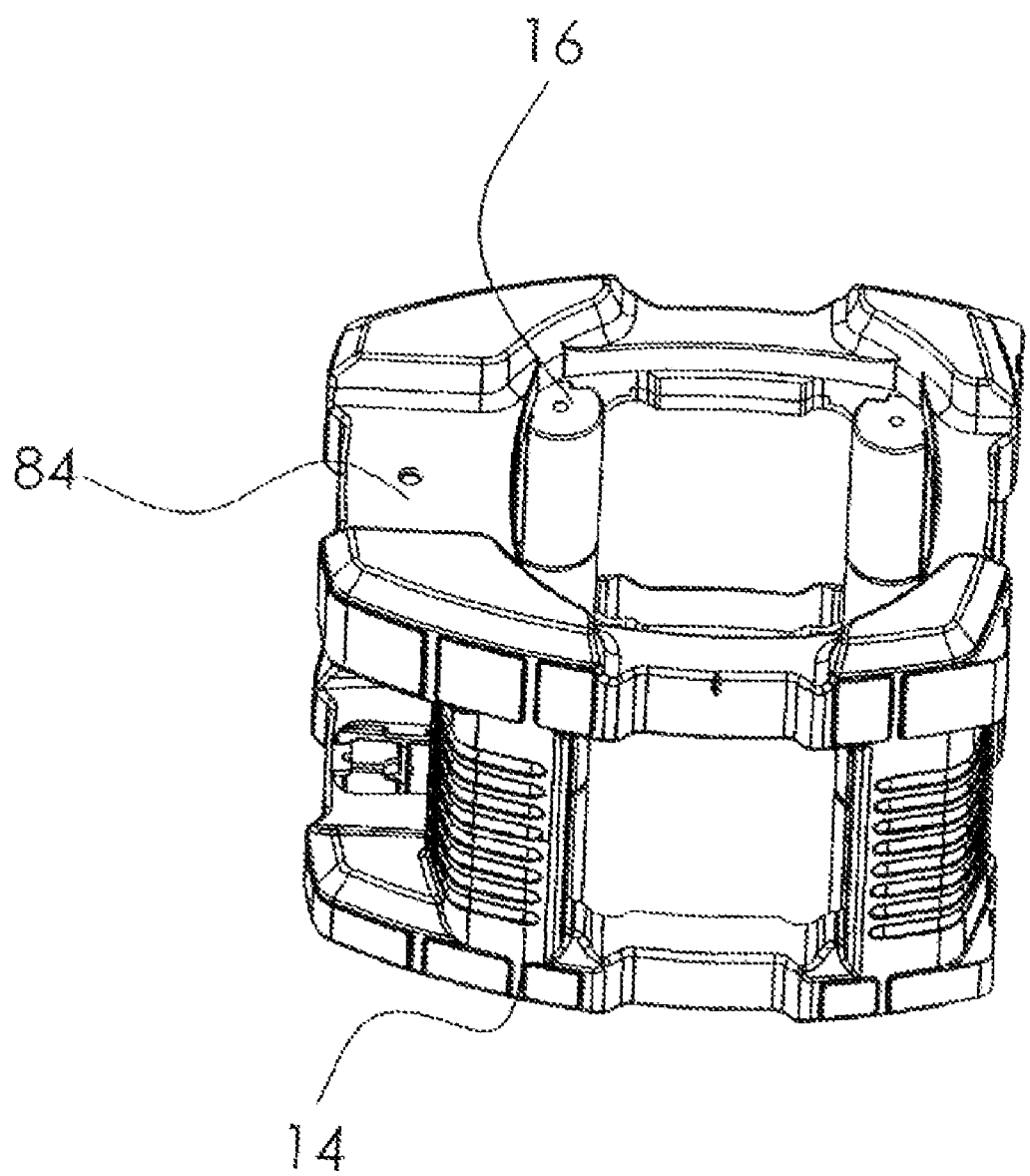
FIG. 3: The assembled sections of the core according to FIG. 2.
Figure 4:
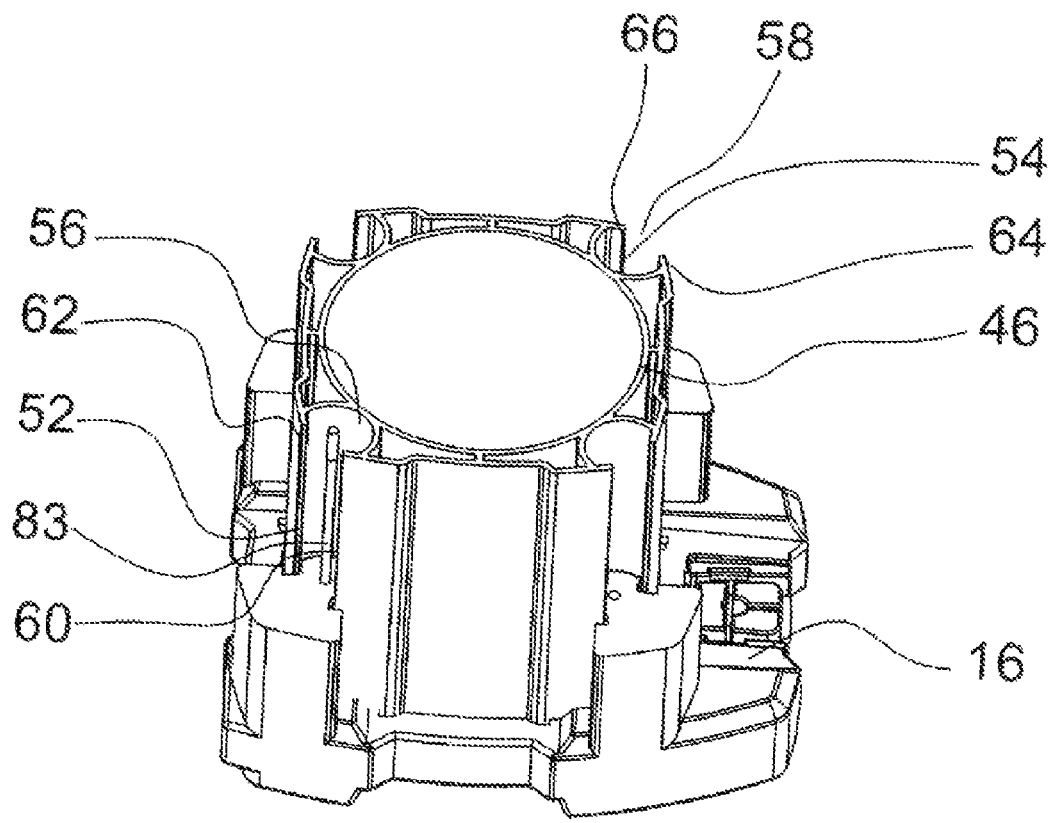
FIG. 4: A section of a protective housing, which is attached to an instrument housing.
Figure 5:
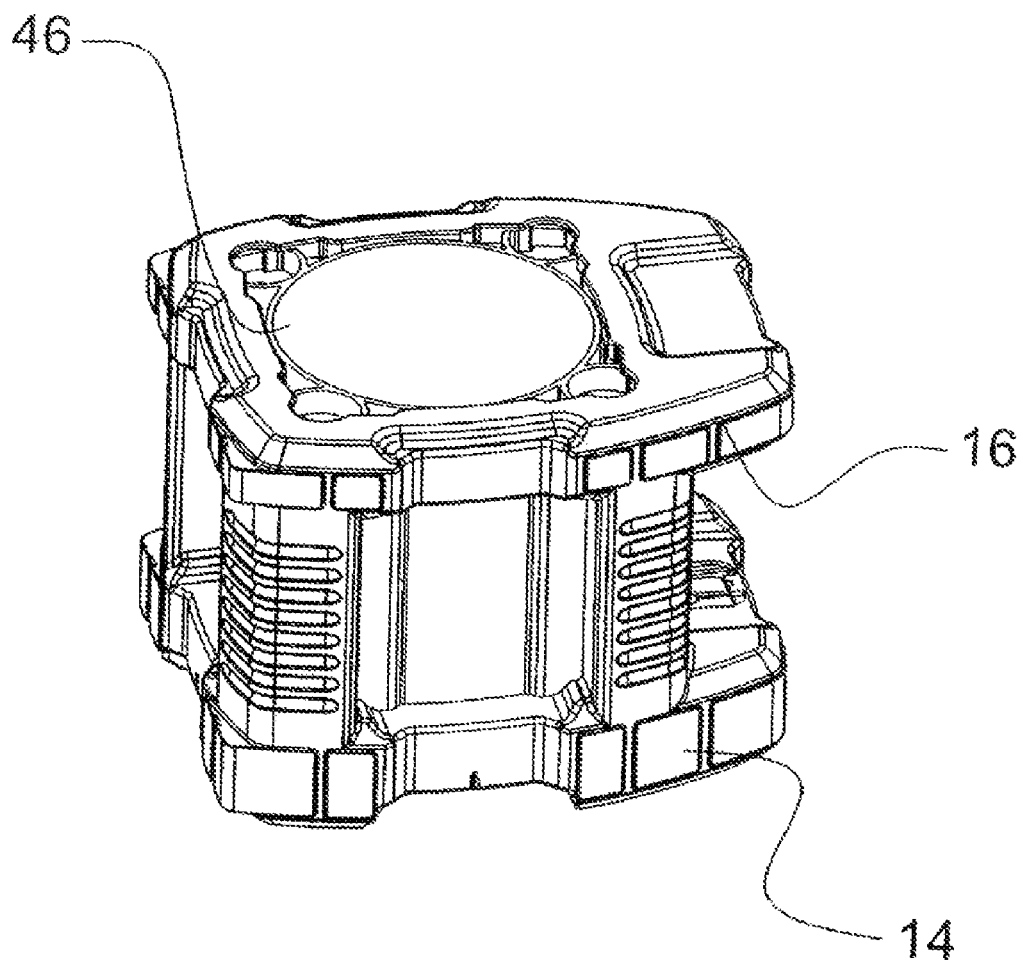
FIG. 5: The sections according to FIG. 2, which are connected to the instrument housing according to FIG. 4.

In this version the protective housing 12 incorporates three components, of which two components 14, 16, which may be formed identically, make up the core 22 (FIG. 2). Each component 14, 16 consists of a frame 26, 28, from which the arms 30, 32, 34, 36 and/or 38, 40, 42, 44 originate. As can be seen in FIG. 3, the components 14, 16, i.e. sections of the core 22 can be assembled, whereas the arms 30, 40, 32, 38, 34, 44, 36, 42, 44 align axially. The assembled components or sections 14, 16 form a framework in the shape of a rectangular prism, which completely encloses the instrument housing 46 as shown in FIGS. 1 and 5.

A radial attachment of the components or sections 14, 16 to the instrument housing 46 is accomplished through the arms 30, 32, 34, 36, 38, 40, 42, 44, namely through its internal cylindrical sections, of which a few are marked as examples with the reference marks 48, 50. The cylindrical sections 48, 50 are assigned to cylindrically hollow receptacles 52, 54 within the instrument housing 46, which have longitudinal slots 56, 58 that are restricted by bars 60, 62, 64, 66. The bars 60, 62, 64, 66 then engage in the undercuts 68, 70, 72, 74, which limit the cylindrical sections 48, 50.

The casing and/or sheathing 24, which enclose the core 22 and/or the components or sections 14, 16, and which do not have to be materially connected to the core 22, can be held in place by the bars 60, 62, 64, 66 of the instrument housing 46, which engage in the undercuts 68, 70, 72, 74. In other words, the sheathing 24 is clamped in place between the core 22 and the instrument housing 46. Other measures are also possible. Another possibility is a material bond connection between the sheathing 24 and the core 22 in at least a few points.

If the radial attachment of sections 14, 16 is accomplished by the cylindrical sections 48, 50 and their engagement into the cylindrically hollow receptacles 56, 58, this will result in an axial connection through bores 76, 78, 80, 82 located within the bars or arms 30, 32, 34, 36, 38, 40, 42, 44. These will be penetrated, for example, by stud screws 83 that are inserted into threaded sleeves. Additional attachment options are also possible.

The illustrations also show, that one arm of the frame 26, 28 is formed larger than the remaining arms. These are the frame arms 82, 84 in the embodiment. When the protective housing (FIG. 1, FIG. 4) is assembled and encloses the instrument housing 46, a handle 86 is attached between the larger arms 82, 84 making it therefore unnecessary to originate from the laser device 10, thus providing an additional means of shock-protection.

In order to protect the laser emitting optic as well, the invention provides for the attachment 18, which is preferably connected with the upper frame, therefore frame 28 of the upper section 16, by means of snap-on or plug-in connection. The attachment 18 consists of lower rim or ring 88, which is preferably made of fiberglass-reinforced plastic, such as Polyamide, and which is connected to the upper ring element 98 by flat bars 90, 92, 094, 96, and which is enclosed by a protective device, which according to the premise of the invention consists of a core and a sheathing and/or casing.

Figure 7:
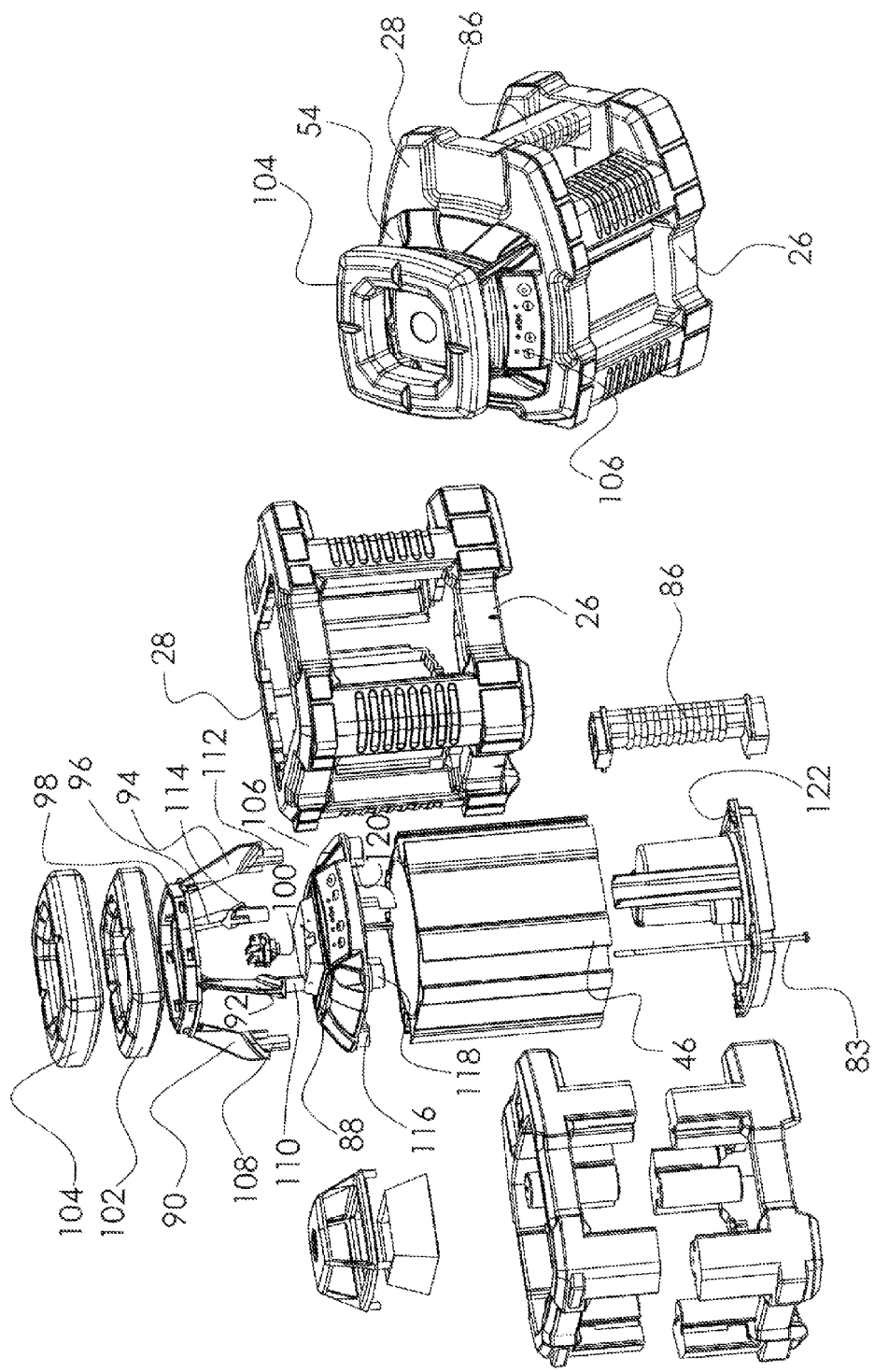
FIG. 7: An exploded view of the elements of the protective housing that enclose the laser instrument.

The lower rim or ring 88 accepts the emission optic 100 of the laser instrument, as can be particularly seen in the exploded view according to FIG. 7. The laser optic 100 can therefore be accepted and/or enclosed by a bracket, which in turn is enclosed in sections and held in place by the lower rim and/or ring 88.

The flat bars 90, 92, 94, 96, which are to be identified as feet, are connected to the upper ring 98, for instance, by plug-in connections. An integral construction is also possible. The upper ring 98 is therefore enclosed by a core 102, which is made of EPDM and has a circular shape, and which is in turn enclosed by a casing 104 that forms the sheathing, as can be seen in the depictions of FIG. 7.

The lower ring and/or rim 88 also accept a control panel 106, which is used to operate the laser instrument.

In order to position and fasten the lower ring 88, the extensions 108, 110, 112, 114 of the bars or feet 90, 92, 94, 96 engage in correspondingly adapted sleeve-like receptacles 116, 118, 120 of the ring or rim 88 and assume the function of internal threaded sleeves, into which the stud bolts can be screwed, which in turn originate from, and/or are inserted into, a floor plate 122, that closes off the laser housing 46 at the bottom. For this purpose, the floor plate 122, for instance, extends with a surrounding bar partially into the housing 46 and furthermore extends, for instance, with a flange-type edge so far, that the stud bolts can be screwed into respective threads. The stud bolts furthermore penetrate the bores 76, 78, 80, 82 in the bars 30, 32, 34, 36, 38, 40, 42, 44, which axially secure the protective housing 12. The protective housing 12 is therefore, in the proper meaning of the word, axially held in place by the ring and/or rim 88, which is located on the side of the housing and incorporates the control panel 106, and the bottom plate 122. The stud bolts between the feet 90, 92, 94, 96 and the bottom plate 122, secure the lower ring 88.

A comparison of the illustrations also shows that the lower frame 26 of the protective housing 12 encloses the bottom plate 122 to make it shockproof. The upper frame 28 encloses the lower ring 88 with the control panel 106 to such degree that it is also shockproof. The bars or feet 90, 92, 94, 96 are offset in relation to the circumferential surface of the upper frame 28 and the protection surrounding the upper ring 98, in such a manner that these bars or feet 90, 92, 94, 96 displace inward in an offset relative to the casing, which is stretched from the upper protective ring 102, 104 and the protective housing 12.

If, according to the version of FIGS. 1 through 7, the protective housing results in a shape of an open rectangular prism it is then possible, that a housing, which is to be protected, is secured in such manner, that core elements made from expanded Polypropylene, which have the shape of corner elements, are placed on the corners of a housing, whereby the corner elements are connected to each other through strip- or band material that is made of rubber-elastic material, so that, in respect to corner elements and strip- and/or band material, this basically results in a construction, which describes the invention-related protective housing. The corner elements exercise a shock-absorbing function, while the sheathing from the rubber-elastic material, especially such as EPDM, provides a protection against abrasion as well as against penetration by sharp objects.

Figure 8:
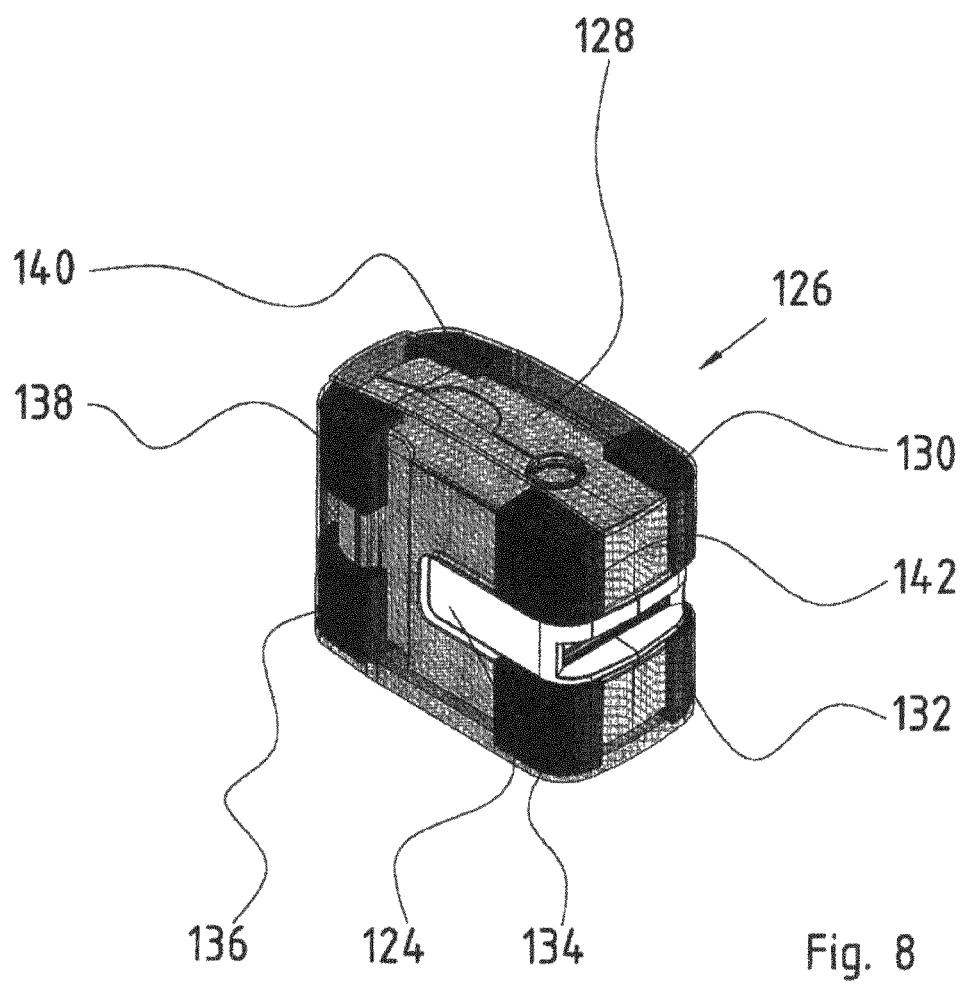
FIG. 8: An additional embodiment of a protective housing enclosing an instrument.
Figure 9:
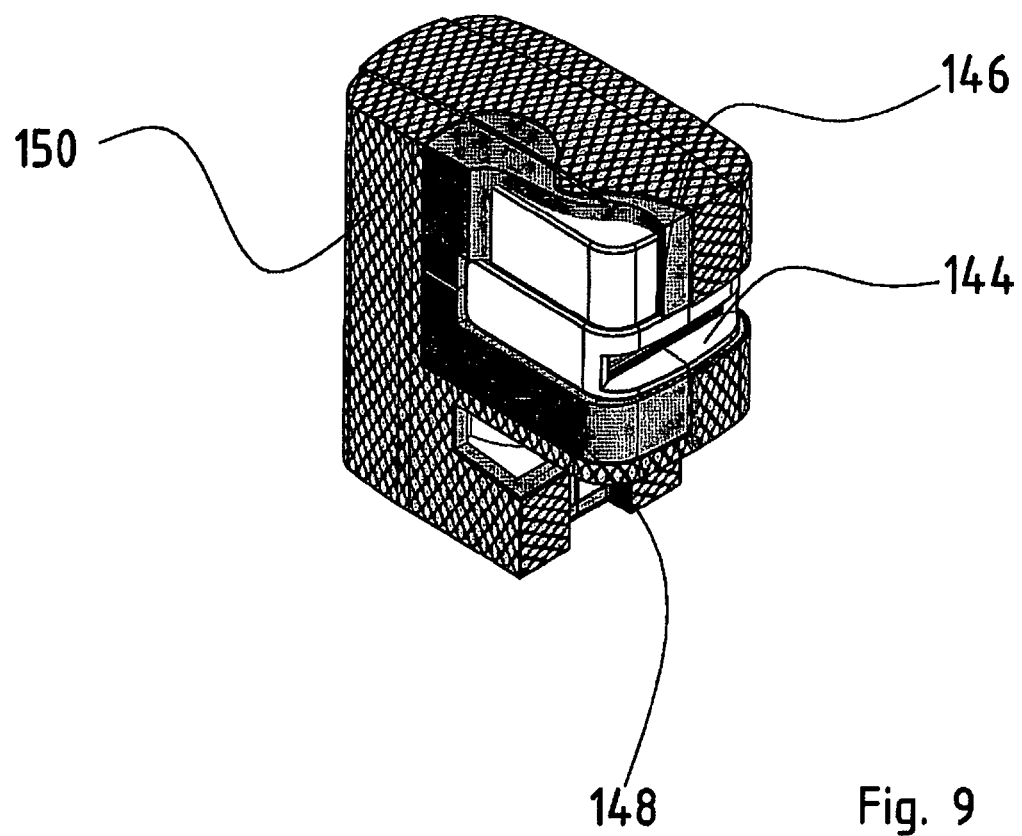
FIG. 9: A third embodiment of a protective housing enclosing an instrument.
Figure 10:
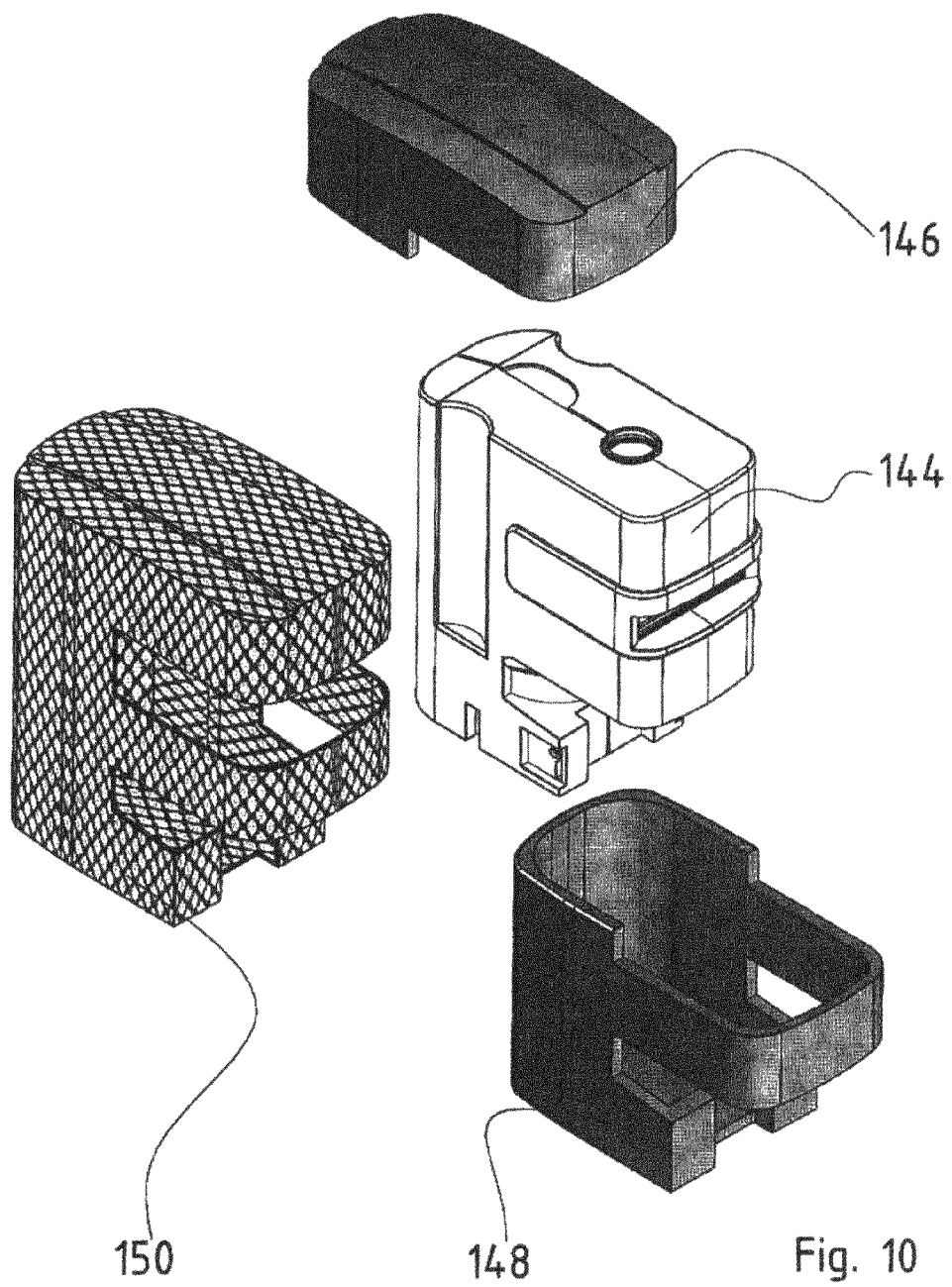
FIG. 10: An exploded view of the protective housing according to FIG. 9.

Further variants relating to the principle of the invention can be found in FIGS. 8 through 10. FIG. 8 thus illustrates, that a housing, such as instrument housing 124, is enclosed by a protective housing 126, which consists of a core that is made of thermoplastic material, such as expanded Polypropylene (EPP), and which is assembled from corner elements 130, 132, 134, 136, 138, 140, 142. This is enclosed and held in place by a sheathing 128, which according to the invention is made of a rubber-elastic material, such as natural rubber. The sheathing 128 is a sleeve, which encloses the corner elements 130, 132, 134, 136, 138, 140, 142 without covering areas of the housing 124 that must remain functionally accessible.

The execution model found in FIGS. 9 and 10 should again illustrate, that the invention-related protective housing consists of a two-part core and a casing—also referred to as sheathing or sleeve—surrounding same. A protected housing 144, which for instance may be a housing for a laser device, is thus enclosed by sections 146, 148 in a mostly form-fitting design, which form the core of thermoplastic material. When the core 146, 148 is attached to the housing 144, a sleeve or casing 150, which is made of rubber elastic material, such as natural rubber, is put over the core 146, 148, so that for one thing the core 146, 148 is sufficiently held in place on the housing 144, and the core 146, 148 is also protected against abrasion as well as against penetration by sharp objects. The sheathing 150 consists of rubber elastic material and is therefore stretchable. The sheathing 150 will stretch to a degree that is sufficient to allow putting it over the core 146, 148.

What is claimed is:

1. In combination, a measuring instrument housing and a protective device for the measuring instrument housing surrounding the measuring instrument housing, the measuring instrument housing comprising a hollow housing body which is constructed and arranged for receiving therein a measuring device, and having an outer surface, a predetermined length and a longitudinal axis, and the protective device form-fittingly held by the housing, and comprising:

a core which is made of thermoplastic material externally surrounding the measuring instrument hollow housing body in sections which are spaced to expose the outer surface of the measuring instrument housing between the sections, the core being fixed to the measuring instrument housing and protecting the measuring instrument housing against shocks, and a sheathing surrounding the core and protecting the core against abrasion and penetration by sharp objects, wherein the sheathing is at least one material selected from the group consisting of a rubber elastic material, a natural rubber, a thermoplastic elastomer, an ethylene-propylene-diene rubber, and a foil or fabric laminated onto the core; and wherein the sheathing is held in place between the core and sections of the instrument housing.

2. The combination according to claim 1, wherein at least one of corners and edges of the housing, the core comprises supportable elements which are arranged at a distance from each other, and which are at least one of connected via the sheathing and surrounded by the sheathing, at least in sections.

3. The combination according to claim 1, wherein the core comprises sections which can be assembled.

4. The combination according to claim 1, wherein the sheathing is made up of a at least one component.

5. The combination according to claim 1, wherein the sheathing and the core are separately produced components.

6. The combination according to claim 1, wherein sections of the instrument housing engage in undercuts of the core, with longitudinal arms of the core radially attaching the core to the instrument housing.

7. The combination according to claim 1, wherein at least one of the core and the housing has a frame at a top and a bottom thereof with one arm each, which generate a plane, between which a handle is integrated.

8. The combination according to claim 7, wherein the handle is held in place between the frames.

9. The combination according to claim 7, wherein an offset laser optic attachment emanates from the top frame.

10. The combination according to claim 9, wherein the attachment is connected with the top frame through a snap-in or plug-in connection.

11. The combination according to claim 9, wherein the attachment comprises a first ring element, which emanates from the top frame, and a second ring element, which is connected to the first ring element through flat bars.

12. The combination according to claim 11, wherein at least one of the first ring element and the flat bars comprises plastic.

13. The combination according to claim 11, wherein the plastic is a fiber reinforced plastic.

14. The combination according to claim 11, wherein the first ring element is at least one of a receptacle for a laser and a part of a laser.

15. The combination according to claim 11, wherein the first ring element incorporates a control panel.

16. The combination according to claim 11, wherein the first ring element is secured against the instrument housing by means of the bars.

17. The combination according to claim 16, wherein the bars at a housing side have extension sleeves with internal threads, into which connection elements are inserted, which originate from a bottom plate of the instrument housing, screw into the bottom plate of the instrument housing, or both originate from and screw into the bottom plate.

18. The combination according to claim 17, wherein the connection elements penetrate longitudinal arms of the core.

19. The combination according to claim 11, wherein the bars are connected to the second ring element through plug-in connections or are built as an integral part of the second ring element.

20. The combination according to claim 11, wherein the second ring element comprises plastic.

21. The combination according to claim 11, wherein the second ring element is at least in sections enclosed by an additional ring element which is made of a thermoplastic material, which in itself is enclosed by a casing.

22. Protective device according to claim 1, wherein the core comprises expanded polypropylene.

23. The combination according to claim 1, wherein the housing body is generally circular or rectangular in cross-section.

24. The combination according to claim 1, wherein the sheathing is a skin formed by heat treatment of the core.

25. In combination, a measuring instrument housing and a protective device for the measuring instrument housing surrounding the measuring instrument housing,
the measuring instrument housing comprising a hollow housing body which is constructed and arranged for receiving therein a measuring device, and having an outer surface, a predetermined length and a longitudinal axis, the hollow housing body comprising in sections along an outer surface thereof, outwardly facing open channels, each of said channels having a length substantially equal to the predetermined length of the housing body and a longitudinal axis corresponding to the longitudinal axis of the hollow housing body, and
the protective device form-fittingly held by the measuring instrument housing, and comprising:
a core which is made of thermoplastic material externally surrounding the measuring instrument housing in sections which are spaced to expose the outer surface of the housing between the sections, the core protecting the measuring instrument housing against shocks, and
a sheathing surrounding the core and protecting the core against abrasion and penetration by sharp objects,
a section of the protective device being form-fittingly held in each of the channels, and extending outwardly therefrom
wherein the sheathing is at least one material selected from the group consisting of a rubber elastic material, a natural rubber, a thermoplastic elastomer, an ethylene-propylene-diene rubber, and a foil or fabric laminated onto the core.

26. The combination according to claim 25, additionally comprising sections of the protective device which extend laterally along the outer surface of the measuring instrument housing, and which connect adjacent sections of the protective device extending outwardly from adjacent channels.

27. In combination, a measuring instrument housing and a protective device for the measuring instrument housing surrounding the measuring instrument housing,
the measuring instrument housing comprising a hollow housing body which is constructed and arranged for receiving therein a measuring device, and having an outer surface, a predetermined length and a longitudinal axis, and
the protective device form-fittingly held by the housing, and comprising:
a core which is made of thermoplastic material externally surrounding the measuring instrument hollow housing body in sections which are spaced to expose the outer surface of the measuring instrument housing between the sections, the core being attached to the measuring instrument housing and protecting the measuring instrument housing against shocks, and
a sheathing surrounding the core and protecting the core against abrasion and penetration by sharp objects,
wherein the sheathing is at least one material selected from the group consisting of a rubber elastic material, a natural rubber, a thermoplastic elastomer, an ethylene-propylene-diene rubber, and a foil or fabric laminated onto the core,
wherein the core comprises arms which originate from a frame with cylindrical sections, which in sections are form-fittingly received by hollow cylindrical sections, which each has one longitudinal slot, of the instrument housing.

28. The combination according to claim 27, wherein the frame has a rectangular geometry.

29. In combination, a measuring instrument housing and a protective device for the measuring instrument housing surrounding the measuring instrument housing, the measuring instrument housing comprising a hollow housing body which is constructed and arranged for receiving therein a measuring device, and having an outer surface, a predetermined length and a longitudinal axis, and the protective device form-fittingly held by the housing, and comprising:

a core which is made of thermoplastic material externally surrounding the measuring instrument hollow housing body in sections which are spaced to expose the outer surface of the measuring instrument housing between the sections, the core being attached to the measuring instrument housing and protecting the measuring instrument housing against shocks, and a sheathing surrounding the core and protecting the core against abrasion and penetration by sharp objects, wherein the sheathing is at least one material selected from the group consisting of a rubber elastic material, a natural rubber, a thermoplastic elastomer, an ethylene-propylene-diene rubber, and a foil or fabric laminated onto the core, wherein the core has a framework in the shape of a rectangular prism with longitudinal and cross arms; and wherein sections of the core are connected by connecting elements which extend through the longitudinal arms of the core.

* * * * *